(12) United States Patent
Naddy

(10) Patent No.: US 6,497,816 B2
(45) Date of Patent: Dec. 24, 2002

(54) OPEN GUTTER STRAINER (OGS)

(76) Inventor: William Naddy, 5802 Allisonville Rd., Indianapolis, IN (US) 46220

(*) Notice: Subject to any disclaimer, the term of this patent is extended or adjusted under 35 U.S.C. 154(b) by 0 days.

(21) Appl. No.: 09/844,817

(22) Filed: Apr. 30, 2001

(65) Prior Publication Data

US 2001/0030149 A1 Oct. 18, 2001

Related U.S. Application Data

(63) Continuation-in-part of application No. 09/766,376, filed on Jan. 22, 2001.
(60) Provisional application No. 60/162,854, filed on Nov. 1, 1999, and provisional application No. 60/190,045, filed on Mar. 17, 2000.

(51) Int. Cl.[7] .............................................. E04D 13/076
(52) U.S. Cl. ...................... 210/162; 210/170; 210/460; 210/499; 52/12
(58) Field of Search ................................ 210/162, 170, 210/459, 460, 474, 499; 52/12, 16

(56) References Cited

U.S. PATENT DOCUMENTS

| | | | | |
|---|---|---|---|---|
| 520,993 A | * | 6/1894 | Keller | 210/162 |
| 737,138 A | * | 8/1903 | Ralston | 210/162 |
| 939,838 A | * | 11/1909 | Hensler | 210/162 |
| 956,372 A | * | 4/1910 | Kreutzberg | 52/12 |
| 1,012,764 A | * | 12/1911 | Van Tassel | 210/162 |
| 2,090,997 A | | 8/1937 | French | |
| 2,494,780 A | * | 1/1950 | Schmidt | 210/162 |
| 4,247,397 A | * | 1/1981 | Dobosai | 210/162 |
| 4,472,274 A | | 9/1984 | Williams | |
| 4,615,153 A | * | 10/1986 | Carey | 210/162 |
| 4,801,377 A | | 1/1989 | Bolt | |
| 5,526,612 A | | 6/1996 | Wade | |
| 5,678,360 A | * | 10/1997 | Fort et al. | 210/474 |
| 6,219,972 B1 | * | 4/2001 | Zusy | 52/12 |
| 6,263,618 B1 | * | 7/2001 | Jones | 210/459 |

* cited by examiner

Primary Examiner—Christopher Upton
(74) Attorney, Agent, or Firm—Robert A. Spray, Pat. Atty.

(57) ABSTRACT

A device to be used as part of a new or existing rain gutter system, positioned between and joining an open-end gutter and the downspout, that utilizes the movement of flowing rain water to keep the system open and draining by floating and pushing nuisance debris to and out the low open end on to the invention. Removal of the low point end stop and repositioning the downspout connector eliminates the primary causes of pooling and build up of debris. Very steep smooth parallel bars, covering the top of a trough-shaped collector box. receive the effluence and separate the solids from the liquid, as the solids slide down and off the end while the liquids fall between the bars into the collector box for passage to the downspout connected at the bottom. The device enables the gutters to discharge at speeds and volumes consistent with collection minimizing the possibility of spillage while, at the same time, keeping the system open and flowing without the need for frequent hand cleaning. A versatile connector-adaptor enables connections to selected rectangular and round downspout pipe, rotating to accommodate the attitude of the pipe.

6 Claims, 8 Drawing Sheets

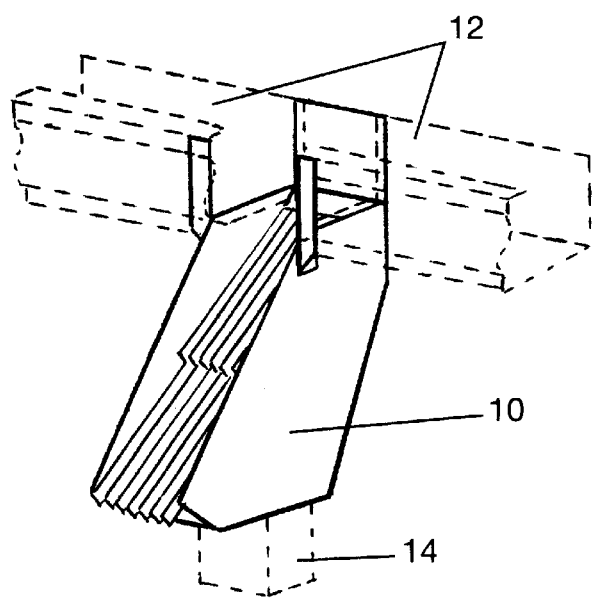
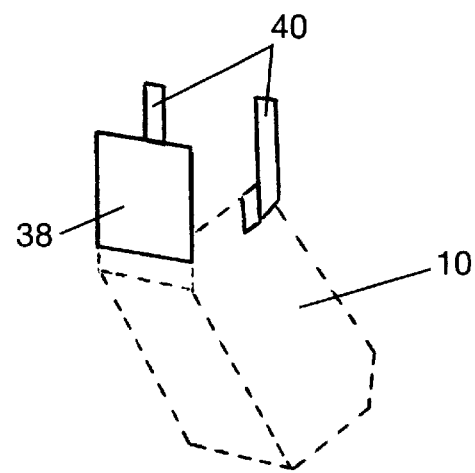
FIG 19     FIG 20
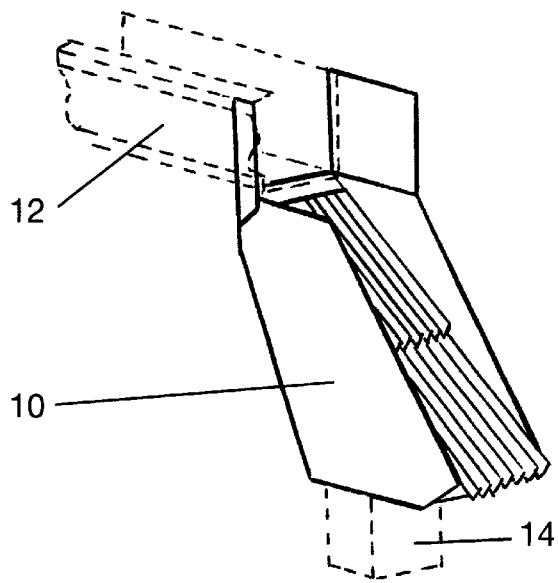
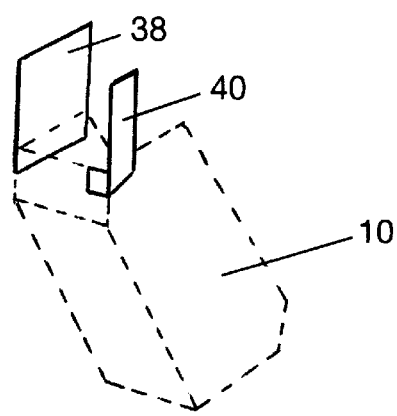
FIG 21     FIG 22

OPEN GUTTER STRAINER (OGS)

REFERENCES TO RELATED APPLICATIONS

Disclosure Document Reg. No. 461,136 Aug. 25, 1999 Provisional Patent No. 60/162,854 Nov. 1, 1999 Provisional Patent No. 60/190,045 Mar. 17, 2000 CIP patent application Ser. No. 09/766,376 Jan. 22, 2001.

BACKGROUND AND PRIOR ART

Field of Invention

The invention presented relates to the general field of rain gutters as attached to a structure for collection and proper disposal of rain water. More specifically, it relates to removal of unwanted solid debris such as leaves, twigs, and bark that accumulate at downspout openings causing stoppage and spillage of water.

Improper care in disposal or dispersion of drainage water can result in erosion of soil and serious damage to land and property. This is particularly true of rain water, as it appears to be falling harmlessly off the edges of roofs. The continued seepage of rain water through the porous soil around and under a structure results in such erosion. This erosion will eventually undermine the foundation causing cracks and ensuing damage.

To control this problem, rain gutters are installed on most structures to carry away the run-off from the roof. These gutters are pitched at a slight downward angle allowing the water to be channelled to the low point where it is discharged through an opening in the bottom. The water exits through this opening into a pipe called a downspout, and it continues to flow through this pipe to a sewer or other means of dispersion on the ground away from the building foundation.

As long as the system remains open and flowing, the water is harmlessly disposed. Interruptions to this free-flow do occur, however, caused by the collection of leaves, twigs, bark, and other undesired debris along with the water. The debris can move with the water to the openings, and these openings are smaller than the gutter, causing restrictions. At these points solids in the effluence accumulate building up with each new rainfall until clogging occurs. The stoppage can take place at the opening in the gutter or in the downspout pipe. Ensuing rain can cause a pooling of water, and the gutters fill to capacity until spillage occurs over the sides contributing to the possible erosion of the foundation of the structure. This accumulation of water puts a heavy load on the gutter supports. This load can cause bending and sagging resulting in the loss of proper drainage angle of flow, often permanently. To keep the gutters open, the property owner must clean them frequently or use some method of preventing the accumulation of such debris. Since cleaning can be dangerous and distasteful, or costly, many products have been advanced to assist in attempting to keep gutters open and flowing.

These products can be divided into four different categories:

1. The first is devoted to preventing debris from entering the gutters.
2. The second is devoted to preventing debris already in the gutters from entering the downspout.
3. The third is designed to separate and eject debris after it has passed through the downspout connector.
4. A fourth method advanced allows debris and water to fall through an opening in the bottom of the gutter onto a collector positioned below the opening designed to screen out the solids.

Category No. 1

It appears that one of the earliest methods of preventing debris from entering the gutters was a screen over the top, completely around the structure. U.S. Pat. No. 3,053,393 September 1962 McLean was awarded for a gutter cover made of sheet metal with round perforated holes keeping the debris out while allowing the water to enter. From this many new screens have been fashioned incorporating expanded metal and hardware cloth, as well as other straining materials. Of late, screens have been made from both flexible and rigid plastic with varied openings. A problem with mesh screens is its propensity to snag leaf stems and other erose points. This snagging holds the leaves in accumulated layers blocking the water from entering, causing spillage over the edge. The leaves are also held until they dry, becoming brittle. The dried leaves break off, and a part falls into the gutter. This accumulation and build-up must be removed to prevent blockage. Cleaning under the screens makes a distasteful task more unpleasant. Some screens are now made with hinges to facilitate cleaning.

An additional method of shielding the gutters from receiving debris is a cover made from metal or plastic without perforation. The solid cover extends over the top of the gutters at a downward angle allowing the water and debris to slide over the side. The debris is free to fall, but a rounded outer edge on the shield causes the water to cling by surface tension until it can fall through a narrow opening into the gutter. The narrow opening keeps most of the unwanted solids out, but many of these products are equipped with hinges for cleaning the accumulation that does occur. During heavy rain when sudden surges of rain overcome the capacity of surface tension, spillage can be experienced.

Category No. 2

The second general method of preventing interruption of water flow is to attempt to screen the downspout opening from debris that has already entered the gutters. U.S. Pat. No. 2,210,248 August 1940 Lighthill was awarded for a device with closely spaced "fingers" to be placed in the gutter over the downspout opening. A derivation of this idea is now in widespread use made from wire or mesh in the form of a pear that is placed in the downspout connector at the gutter level. This is designed to hold back the solids in the gutter while letting the water pass through. Other screening devices include boxes with removable screens for cleaning. U.S. Pat. No. 5,107,635 April 1992 Carpenter was awarded for a device that channels the effluence through a cloth sock that retains the solids while letting the liquid pass through the interstices of the cloth.

Since these types of devices are fashioned to retain and accumulate the debris in the gutter, they can do more to aggravate the problem than to relieve it. The property owner is still confronted with the task of frequent gutter cleaning or its harmful alternative.

Category No. 3

A third method of solving the flowage problem is to permit the water and solids to pass down through the downspout connector, or in some cases into the downspout, where a separator is positioned. The debris is separated by a strainer and allowed to slide out the side while the water passes down through the openings in the strainer into the downspout. U.S. Pat. No. 2,090,997 August 1937 French was awarded for a device called a "refuse eliminator" to be placed in the downspout to strain out and eject solids while letting the water fall through. At later dates, U.S. Pat. No. 4,472,274 September 1984 Williams and U.S. Pat. No. 4,801,377 January 1989 Bolt were awarded for similar devices to be installed at the top of the downspout and below the downspout connector to screen solids from the effluence, ejecting them out an opening in the side while letting the water pass through into the downspout. The downspout connector is located at the bottom of the gutter, and is limited in opening size to the dimensions of the gutter. Consequently, only solids that are able to pass through the small opening can reach the strainer, and all other debris remains and gathers in the gutters. This remaining material must be removed by hand at uncertain intervals to prevent accumulation and clogging.

Category No. 4

Two devices have been awarded patents that are similar in design. The principle employed is to allow the effluence to fall through an opening in the bottom of the gutter onto a collector box equipped with a straining system that strains out the solids while allowing the liquid to pass through into the downspout. U.S. Pat. No. 4,615,153 October 1986 Carey allows the effluence to fall onto a solid, slightly curved, surface encouraging the outflow to slide off the side. Surface tension is used to direct the water into slits on two opposite vertical sides while the solids are free to fall clear. The efficiency of the device for collection of water is questioned. The free-fall exposure to the wind opens the possibility that much of the flow could be blown clear of the collector. It is also probable that splashing on the surface of the collector could cause a portion of the water to be lost over the side. In addition, sudden heavy rain could overcome the surface tension on the vertical sides allowing a portion of the water to fall clear of the slits.

U.S. Pat. No. 5,526,612 June 1996 Wade is designed to allow the effluence to fall through an opening in the bottom of the gutter onto a collector positioned below. The collector is made with a series of three mesh strainers on the top and positioned to slope downward at an angle of between 20° and 45° from horizontal. The top mesh screen is spaced to provide openings of 5 mm×5 mm to intercept larger solids, and the secondary screens are spaced to provide openings of 0.09 mm×0.09 mm to screen out small particles.

The efficiency of the water collection is questioned. The opening at the bottom of the gutter is made with a downward wind deflector called a "pop" to shield the effluence during part of the free-fall. Since the downward projection extends only part of the distance to the strainer, the fall is still subjected to winds and splashing. The upper mesh screen positioned at an angle of between 20° and 45° from horizontal (a mean angle of 32½°) offers a high possibility of snagging leaf stems and other erose debris.

Experiments on the device that is the subject of this patent request (OGS) have shown that such a screen has the propensity to snag and hold passing leaves causing ensuing solids to build up. This build-up blocks portions of the screen causing splashing and spillage over the sides. Unless cleaned, the dried leaves break off and accumulate until blockage occurs. (The experiment is explained in a following section.)

It has been related above that, to date, in attempt to keep gutters open and flowing, devices have been advanced that either restrict the collection capability of the gutters, restrict the discharge capacity of the downspouts, or do not maintain control of the effluence through the entire discharge process. Although the experience of the inventor at his own house is similar to that of most property owners, it is mentioned at this point as additional background material. When purchased, the house was equipped with mesh strainers covering the entire gutter system. Constant spillage over the sides, as a result of clogging and excess collection, caused the inventor to discard the strainers after about three years. Downspout screens were retained at each downspout drop making the gutters much easier to clean, but the clogging and spillage continued. After many years of living with these conditions, the problem was diagnosed as a combination of the following conditions:

1. Open-top gutters, draining the entire roof area, have a collection capacity far greater than the capacity of the downspouts assigned to the task of discharging the effluence unless the water can flow rapidly through the downspout at volumes consistent with intake.

2. The rainwater, carrying the debris along, flows to the low end and accumulates, stopped by the end-stop and awaiting the downspout to permit sufficient drainage to clear the gutter. Without water movement the solid debris stays in place and is compacted by ensuing clutter and turns putrid.

3. The opening for the downspout connector is limited in size, and is capable of passing only those solids small enough to fit. Larger solids remain in the gutter near the downspout opening accumulating more debris with each rainfall until the opening eventually becomes clogged. This shuts down the drainage, but the gutters remain open, filling to capacity until spillage occurs.

Using this prior experience as a means of avoiding similar problems, a new device is proposed that keeps gutters open to accept maximum collection capacities, downspouts that are effectively free from impingement, keeping discharge at maximum levels, and a controlled flow of discharge from roof to disposal, free from winds and splashing. This product is named Open Gutter Strainer (OGS), and it is presented in detail herein.

Product Development and Testing

Gutters, open on top, are free to accept the off-fall at full capacity, but to eliminate the accumulation of solid debris carried to the low end by the water flow, the drainage must be capable of discharging effluence in comparable volumes and without restriction. Two such restrictions are the end-stop and the smaller downspout connector opening, and they should be removed.

The background and prior art provided the criterion to create a new device that can keep the gutters open and flowing and enable the system to function at full capacity. All impediments to receiving or discharging the effluence must be eliminated.

The device needed at the end of the open gutter must be both a collector and a strainer to separate the solids while capturing the liquids for proper disposal. Therefore, an elongated collector box was designed to collect and strain the effluence, ejecting the solids while permitting the liquids to flow through the strainer into the collector box and then to the downspout connected to the bottom. The requirements of the collector box were:

1. It must be large enough to catch the effluence exiting from the open gutter.

2. It must contain a screen of some sort to separate the solids from the liquid.

3. It must be mounted at a steep angle to enable the solid debris to slide off the end.

4. It must be capable of connection to new or existing downspouts.

Tests were needed, and to create assimilated house conditions, gutters were temporarily erected and positioned for testing. Old rotting leaves and a hose as the source of water were selected for the test material. Screen material such as expanded metal and hardware cloth were initially selected for testing. The opening sizes in the hardware cloth were ⅛", ¼", and ½". Each was tested at angles between 30° and 60° downward from horizontal. The ¼" and the ½"

snagged the stems and points of the leaves causing a build up of the ensuing effluence, blocking the liquid from entering the collector box and causing spillage. At shallow angles, the solids would not move regardless of greatly increased volume of water and water pressure. At the steep angle of 60° down from horizontal, the leaves could be moved with heavy volume of water, but most of the liquid spilled out the end. Comparable results were experienced with the use of expanded metal with an opening size of ¼". The ⅛" material was free from snagging, but the small openings were closed over by the surface tension of the water, and almost all the liquid was spilled.

A different type of strainer was needed, and a strainer of closely spaced parallel bars seemed most likely to avoid the snagging problem. Smooth parallel bars were introduced into the testing procedure, and the results proved to be very favorable. The snagging was eliminated. The size, spacing, and the angle of installation were determined by trial and error. Repeated testing confirmed successful results.

At that point the testing moved to actual conditions. Hand made units were produced and installed on the inventor's house, and these devices have been in test under actual weather conditions for more than a year. The gutters were cleaned prior to the installation, and they have not been cleaned since. To date, the gutters have remained open and flowing. During this period the gutters have been flushed completely clean on several occasions by heavy rains. At the end of the winter, the encrusted solids were also flushed clean by the melting ice and snow.

INVENTION SUMMARY

This invention consists of a device that creates a new and improved method of channelling rainfall through the existing rain gutter and downspout system in wide use around the world. To prevent erosion under structures, the water must be contained and controlled from the collection by the gutters through the disposal by the downspout drainage pipes. Spillage caused by impingement, blockage due to collected debris, or wind spray must be eliminated, and this new device can accomplish these objectives without the bother or cost of frequent gutter cleaning.

The use of the the OGS in the rain gutter system enables the system to be altered by elimination of the two primary causes of impingement and blockage, the end-stops at the low ends and the downspout connector openings at the bottom of the gutter. This permits free flow of discharge out the end of the open gutters. The OGS mounted at the end of the open gutter receives the effluence and discharges the solids while collecting the liquids for passage to the downspout that is connected at the bottom of the collector box. The free-flow permits the gutter to drain at a rate of speed and in volumes consistent with collection greatly minimizing any opportunity for spillage. The OGS can be used in both new installations and in existing gutter systems, and because of its versatile connector-adaptor it can connect with round or rectangular downspouts in current use. The potential for immediate use of this new in-line collector-strainer represents a very large market which is readily available. The OGS is an inexpensive solution to an old and troublesome problem.

The OGS is comprised of parts which are described and function as follows:

1. The COLLECTOR BOX is an elongated box open on top. It is about 18" in length with bottom and sides about 5½" wide at this length with sloping ends to form a vertical back wall and a horizontal bottom and stub wall at the lower front when mounted on the structure. The box assumes a steep angle down from horizontal. The COLLECTOR BOX collects the liquid and channels it, functioning like a small trough, to the downspout for safe disposal. The COLLECTOR BOX contains a round opening in the horizontal bottom for snug fit with the CONNECTOR-ADAPTOR. The COLLECTOR BOX can be made from formed sheet metal or sheet plastic or it can be molded from metal or plastic.

2. The BAR STRAINER, made from plastic or metal parallel bars, with dimensions of about 10"×1"×⅛" positioned to form spaces between about 10"×1"×⅜". The BAR STRAINER is made of two sets of such bars in two tiers with the upper tier overlapping the lower tier by about 2" providing an over-all length of about 18" and a width of about 5½. The upper tier is positioned with the upper bars over the spaces between the lower tier bars. The BAR STRAINER is placed to cover the entire open top area at an angle of about 55° down from horizontal with the upper end leaning on the back wall of the COLLECTOR BOX and the lower end resting on and extending about 1" out from the front stub wall. The BAR STRAINER intercepts the solids in the effluence, separating them from the liquid, where they slide down and off the end while the liquid falls between the bars into the COLLECTOR BOX.

3. The CONNECTOR-ADAPTOR, preferably made from molded plastic, is designed to connect the COLLECTOR BOX to the downspout pipe. It comprises a ½" wide circular flange with the outside diameter about 5", atop a tubular funnel, and below this are three male connector areas each 1½" high and descending in size from a circular shape sized to connect with 4" plastic drainage pipe to a middle area, sized and shaped to connect with 3"×4" rectangular downspout pipe to a lower area, sized and shaped to connect with 2"×3" rectangular downspout pipe. The CONNECTOR-ADAPTOR can be dropped down through the opening or mounted to the bottom of the COLLECTOR BOX by fasteners through the flange. The circular shape of the connection permits the CONNECTOR-ADAPTOR to be rotated to any angle needed to comply with the position of the downspout. The unneeded stub, below the connector selected area, is cut off and discarded to permit full flow. The CONNECTOR-ADAPTOR is not limited to these sizes.

4. Mounting hardware, consisting of a MOUNTING PLATE and two MOUNTING STRAPS, is used to connect the COLLECTOR BOX to the gutter and to the structure. The OGS can discharge the effluence to the left, to the right, or to the front as determined by the placement of these parts. The MOUNTING PLATE is attached to the COLLECTOR BOX at the upper end on either side or on the back wall, and it is then mounted on the structure. If connected to the side, the BAR STRAINER is pointed to the side, and thus the discharge flows to that direction. By reversing the mounting to the opposite side, the flow is directed to the side in the opposite direction. If the MOUNTING PLATE is attached to the back wall, the discharge is to the front. The OGS is positioned under and behind the gutter allowing the gutter to overlap about ½", and the fasteners pass through both the back of the gutter and the MOUNTING PLATE simultaneously in the overlapped area when driven into the side of the structure. The MOUNTING STRAP(S) are used to hold the COLLECTOR BOX in a touching position with the bottom of the gutter by connecting the outer front area of the COLLECTOR BOX to the upper front of the gutter. The fasteners can be sheet metal screws, rivets, or nuts and bolts, and the OGS is mounted to the structure with screws of no less than ¾" or ring nails.

As a result of this unrestricted open-end discharge, the debris that would otherwise be contained by the lower end-stop is pushed or floated out the end, eliminating build-up and ensuing blockage. The continued flow of effluence out the open end purges the gutter of debris. Depending upon the amount and the frequency of rainfall and melting ice and snow, the gutters are purged, either partially or even completely, keeping the ends open to flow freely. This provides the following benefits:

1. Open-end gutters allow free-flow avoiding spillage and possible erosion.

2. Open-end gutters, purged by rain water, eliminate the need for frequent hand cleaning.

3. Open-end gutters eliminate pooling of water and collected debris that can put heavy weights on the gutters and brackets causing them to bend from proper drainage angles, often permanently.

4. Open-end gutters allow even small amounts of water to drain, eliminating standing water that can provide a breeding area for unwanted insects.

Downspouts may be placed at the ends of the gutter or any place in between. It is, therefore, necessary that the OGS be capable of installation in all such positions. A collector box could be designed for each of these positions, but for the advantage of production economy and easier distribution, separate mounting hardware is favored. Such hardware, consisting of a mounting plate and two mounting straps, can be attached to the collector box in three different points to allow mounting in all necessary positions. The mounting hardware serves to connect the OGS to the gutter and to the structure. The choice of points determines the direction of discharge as desired; either to the left, to the right, or to the front. The methods of mounting the hardware for selected positions are illustrated in FIG. 17, FIG. 18, FIG. 19, FIG. 20, FIG. 21, and FIG. 22.

If the COLLECTOR BOX and the mounting hardware are made from plastic, they may be attached to each other with plastic cement rather than fasteners, and parts made from plastic made be used with parts made from metal interchangeably.

In times of prolonged dry spells, when rain is not available nor expected, the open end enables the gutters to be flushed of undesired debris with only a garden hose.

DESCRIPTION OF DRAWINGS

FIG. 19 illustrates the OGS in intermediate location receiving discharge from both left and right and directing it to the front;

FIG. 20 shows the position of the mounting hardware to accomplish the intermediate location, the mounting plate being positioned at the rear with the mounting straps to the front on both sides;

FIG. 21 illustrates the OGS positioned at the right end of the open-end gutter with the discharge directed to the front, and FIG. 22 shows the position of the mounting plate and the mounting straps to place the OGS at the right end with the discharge directed to the front.

DETAILED DESCRIPTION

Figure 1:
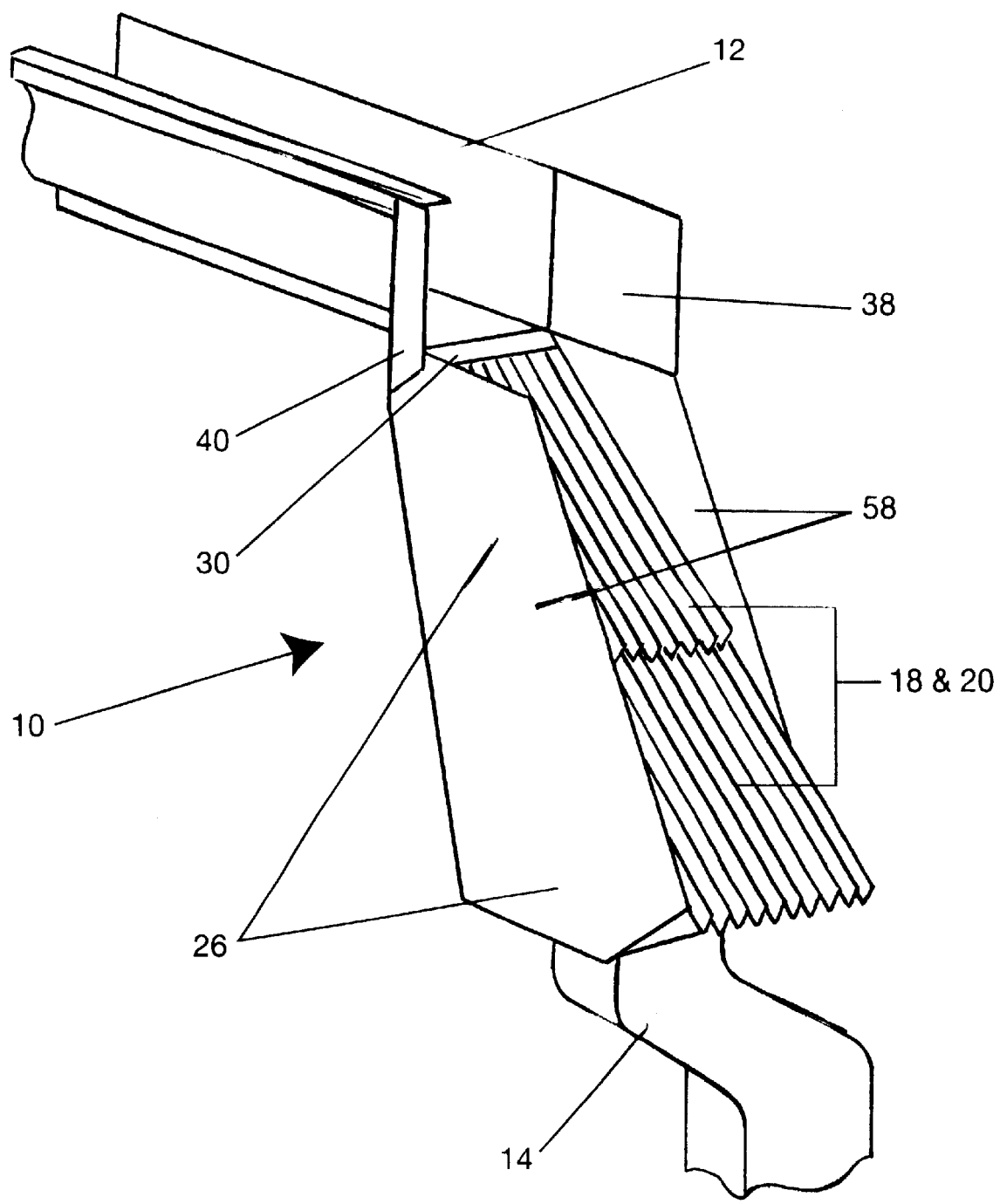
FIG. 1 is a schematic pictorial view of the device which provides an open gutter strainer(OGS) mounted between the rain gutter and the downspout pipe of the associated building.
Figure 2:
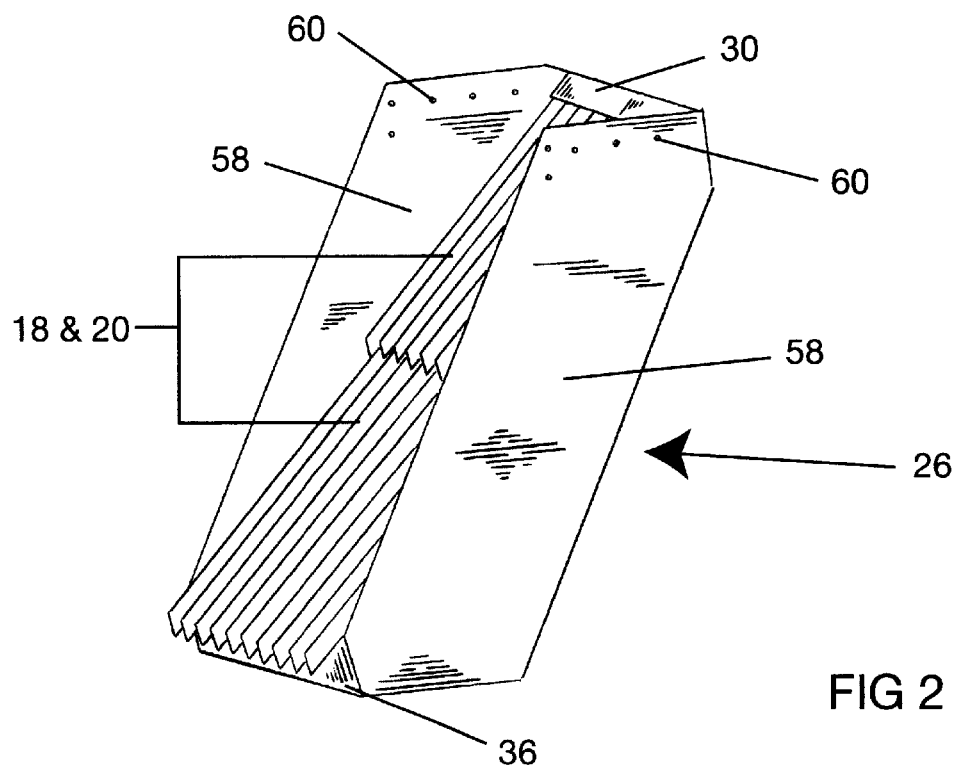
FIG. 2 is a schematic pictorial view, illustrating the collector box from an upper viewpoint.
Figure 3:
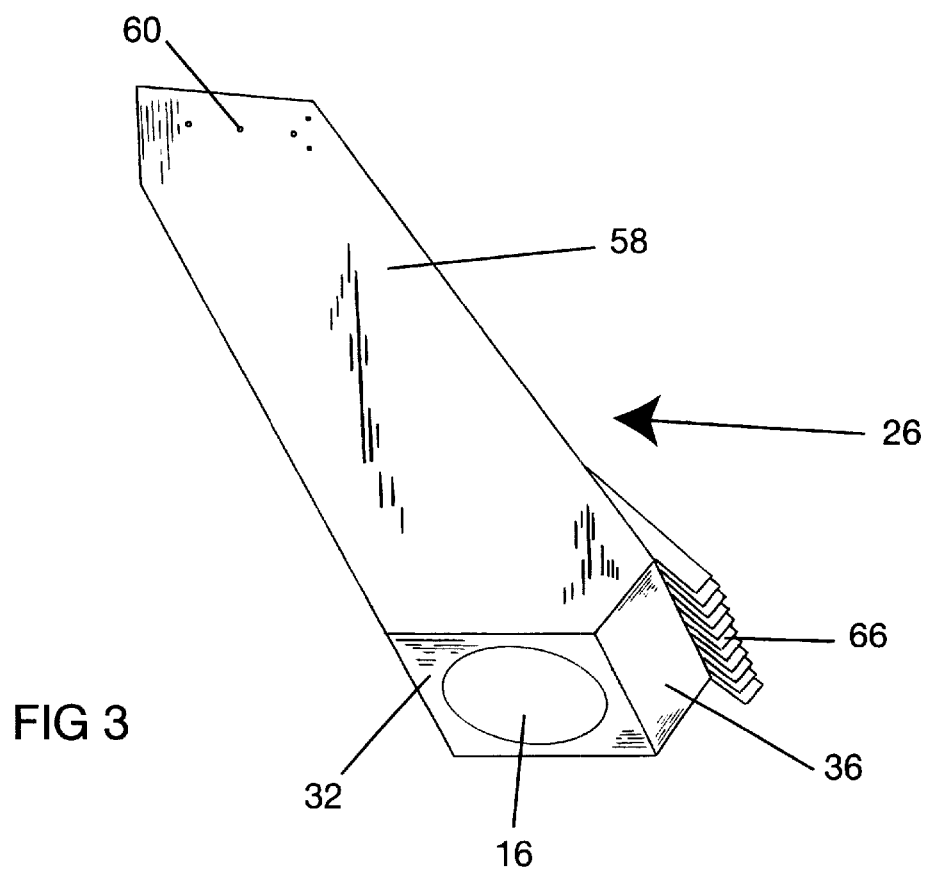
FIG. 3 is a schematic pictorial view of the collector box from a longer viewpoint.

The Open Gutter Strainer (OGS), 10, FIG. 1, is a new and different device to be used in both new and in existing rain gutter systems, functioning as a collector-strainer, that utilizes the flowing rain water to purge the gutters, 12, of undesired solid debris while collecting and channelling the liquid effluence to the downspouts, 14, for proper disposal. The OGS, 10, enables the rain water to keep the gutters, 12, open and flowing, without constant cleaning.

Recognizing that unwanted spillage can be attributed to blockage of the downspouts, 14, caused by accumulation of collected debris, the OGS, 10, eliminates the cause of these accumulations. The flowing water floats and pushes most ordinary debris, such as leaves, twigs, and bark, to the low end where the downspout, 14, should provide drainage. Quite frequently the volume and speed of collection in the gutters, 12, exceeds the capacity of the downspouts, 14, for disposal. At these times the end-stop (not shown) at the low end of the gutter, 12, can serve as a small dam, holding the water in temporary pools, awaiting the drainage of the over-taxed downspouts, 14. The solid debris comes to a halt at these times and much of it is deposited on the bottom of the gutter, 12, as the water pools recede. Also much of the debris is too large to fit through the downspout opening or the strainers (Prior Art) that may be positioned at the top of the downspout opening. These deposits are repeated with the ensuing rain falls, and the downspout openings can become completely blocked with the build up.

Figure 4:
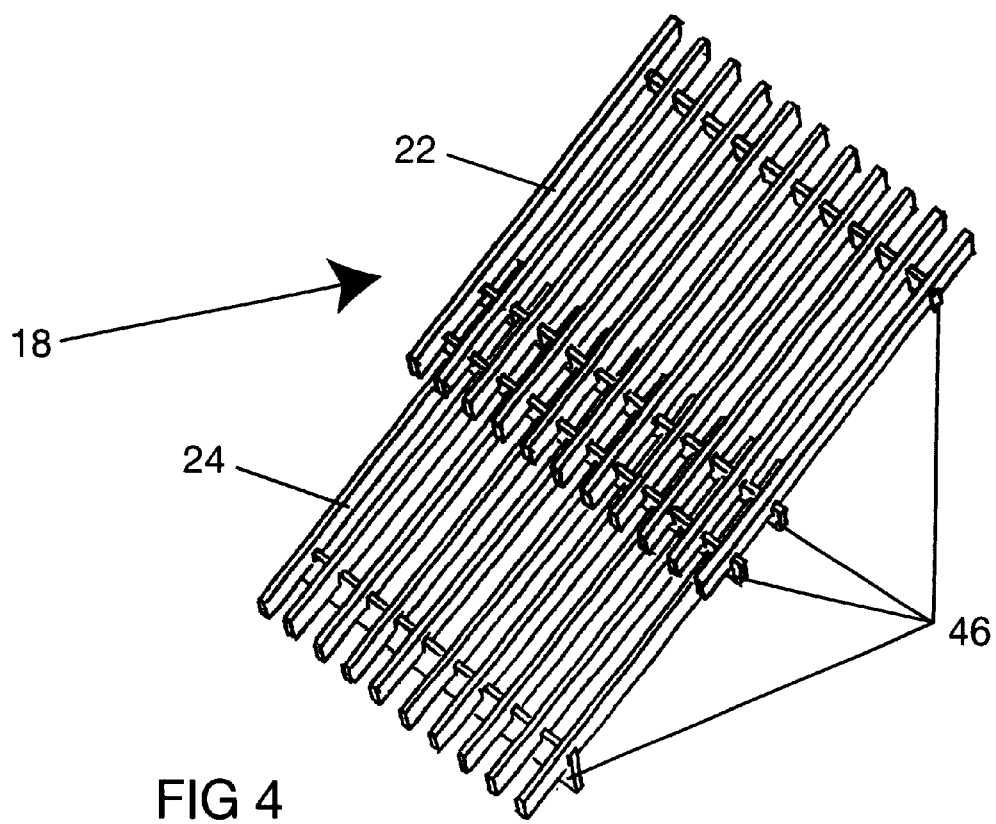
FIG. 4 is a further schematic pictorial view of the open gutter strainer device, particularly illustrating bar components thereof formed by molding.

The OGS, 10, is installed at the end of the gutter, 12, permitting the lower end-stop to be completely removed leaving an open gutter, 12. The OGS, 10, is attached to the gutter, 12, immediately below the gutter's, 12, open end with the gutter, 12, overlapping the OGS, 10, by about ½" in position to receive all the effluence, free from restriction or impingement at volumes and speeds consistent with collection by the gutters, 12. The OGS, 10, functions like a small trough covered with a Bar Strainer, 18 and 20, FIG. 4 and FIG. 5, mounted at a steep angle. The solids are separated from the liquids by the strainer bars, 22, 24, 42, 44, to slide down and off the end, and the liquids fall between the bars, 22, 24, 42, 44, into the small trough, called a Collector Box, 26, FIG. 1, free from splashing and wind spray, to the bottom, 32, where the downspout, 14, is connected for proper drainage disposal. The gutter, 12, remains open and flowing as a result of the moving water's capacity to push and float debris to the open end where it falls out and down. In times of limited rainfall, when dry debris accumulates, it does not compact as in pooled water. As a result even small amounts of water can easily wend its way to the open end for drainage and disposal. Melting ice and snow can move chunks of encrusted effluence out the end during periods of thaw.

The elimination of heavy pooled water and debris protects the gutters from sagging and losing the proper discharge angle. The constant weight of such pooled water and debris can often result in permanently bent gutters and brackets rendering them incapable of performing properly—even after cleaning. The elimination of pooling also removes the added nuisance of breeding areas for mosquitoes and other insects.

The ability of the gutters to purge themselves of solid debris is based upon the quantities and frequency of rainfall. In times of light rainfall the area near the end is purged, but in times of heavy downpours the entire gutter, 12, can be cleared.

The OGS, 10, is comprised of four major components:

1. The Collector Box, 26, is an elongated container open on the top. It is about 18" in length with sides, 58, and bottom, 32, of this length measuring about 5½" in width. The box, 26, is designed to be mounted to the structure at a steep angle, and at this position, the upper end of the box, 26, forms the upper rear wall, 28, at a slanted angle from the lower rear wall, 64, but vertical when installed. The upper rear wall, 28, is about 5½" across and about 2" in height. At the top of the upper rear wall, 28, the full width is bent in to serve as a strainer shield, 30, extending in and down about 1½". At the opposite end of the box, 26, the bottom, 32, is bent to a slanted angle to be in a horizontal position when installed. This bottom area, 32, is about 5½"×5½", and in this surface a circular hole about 4+" in diameter is made to serve as the opening, 16, for the downspout Connector-Adaptor, 34, FIG. 6 and FIG. 8. A stub wall, 36, extends upward from the horizontal bottom, 32, at an angle of about 45°, and measures about 2"×5½". The Collector Box, 26, contains holes, 60, at the upper sides, 58, and upper rear wall, 28, to align and attach to mounting hardware, 38 and 40. The Collector Box, 26, can be formed from sheet metal or sheet plastic, or it can be molded from plastic or weather resistant metal. The OGS, 10, can be made in any size, but for the purposes of trial and development the working samples were made to connect with the most popular size gutters, 4", 5", and 6". Since the Collector Box, 26, is wider than the bottom of these gutters, 12, a single size can be used to accommodate all three. The length of the Collector Box, 26, was determined by the need to capture the discharging water under all possible conditions. Light and medium rainfalls provide an immediate flow of the draining liquid into the Collector Box, 26, but in times of teeming down pours the water flowing through clean gutters, 12, can develop a substantial current speed and will cascade in a wide arc upon leaving the gutter, 12, end. It is, therefore, necessary that the Collector Box, 26, be of sufficient length to capture these surges.

2. The Bar Strainer, 18 and 20, comprised of parallel bars, 22, 24, 42, 44, with dimension of about 18"×5½", is positioned to cover the entire open top area of the Collector Box, 26, extending from the upper rear wall, 28, under the strainer shield, 30, to about 1" beyond and resting on the top of the front stub wall, 36. When installed the Bar Strainer, 18 and 20, assumes a steep angle of about 550 down from horizontal. The Bar Strainer, 18 and 20, is made of bars, 22, 24, 42, 44, in two tiers, measuring about 10"×1"×⅛", arranged in a parallel position with a space between the bars, 22, 24, 42, 44, measuring about 10"×1"×⅜". The two tiers overlap at the center by about 2" with the upper bars, 22, 42, positioned to be over the spaces formed by the lower bars, 24, 44. They are held in position by cross bars, 46, placed under and about 1" in from each end and by two cross bars, 46, between the tiers in the overlapped area.

The Bar Strainer, 18, is held in position in the Collector Box, 26, by the bottom cross bar, 46, resting on the front stub wall, 36; and the upper end, leaning on the upper rear wall, 28, is held from moving by the strainer shield, 30, extending in and down from the top of the upper rear wall, 28. The Bar Strainer, 18 and 20, may be easily removed by lifting the extended front, 66, clear of the front stub wall, 36, and sliding it out.

It is important that the tops and sides of the bars, 22, 24, 42, 44, be smooth, as this provides the passing debris almost no opportunity of snagging. The 1" depth of the spaces and the smooth sides denied the erose protrusions that sag into these gaps almost any chance of catching.

The Bar Strainer, 18 and 20, is made in two tiers to prevent spillage. A single tier bar strainer allows the liquid clinging to the bar by surface tension to spill a significant amount off the end. By stopping the upper tier, 22, 42, at midpoint, the liquid falls into the the Collector Box, 26, between the bars, 24, 44, of the lower tier, and the solid debris continues to slide off the end of the lower tier bars, 24, 44.

Figure 5:
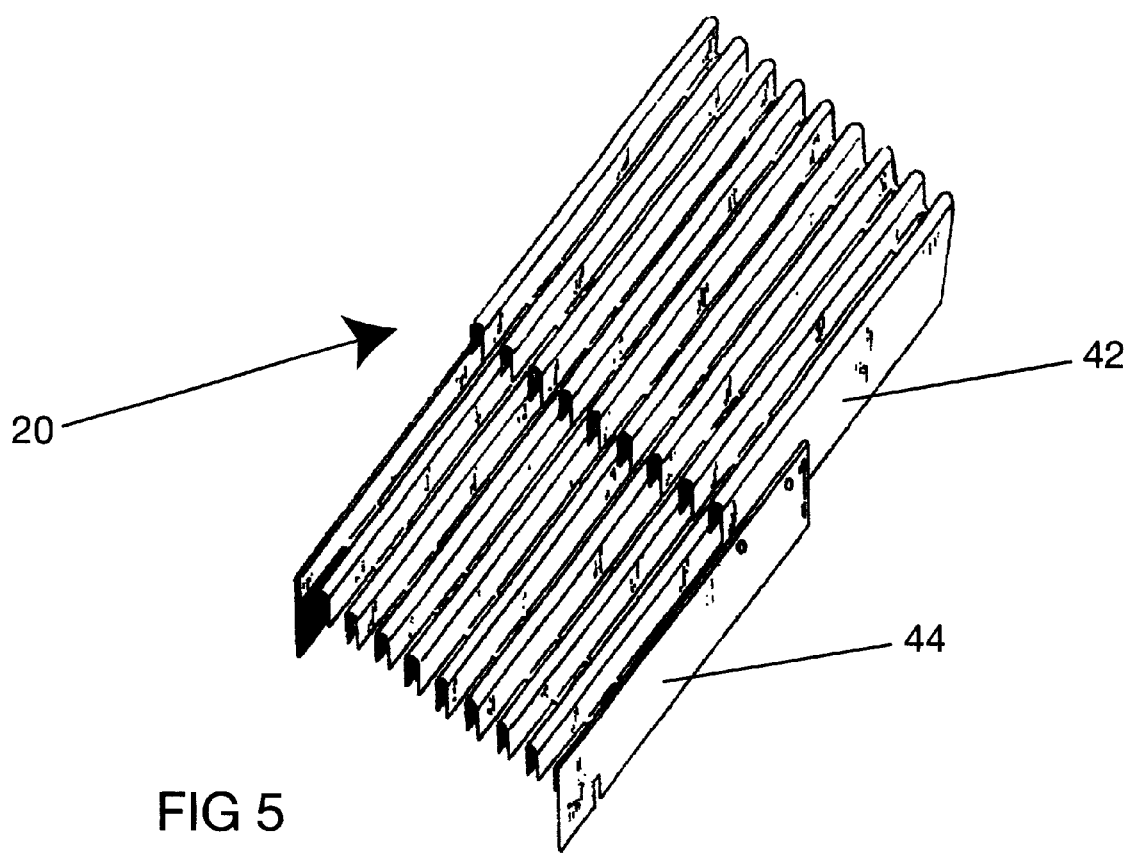
FIG. 5 is a view showing an alternate method of making the bar strainer by forming it in a corrugated shape from flat stock.

The Bar Strainer, 18, described above depicts the Bar Strainer, 18, made from plastic bars, 22, 24, and joined by plastic cement as used in development and testing. In production, however, it is envisioned that this component could be made by molding from plastic or weather resistant metal, or the Bar Strainer, 20, can be made by forming from corrugated sheet metal or sheet plastic as shown in FIG. 5.

Figure 6:
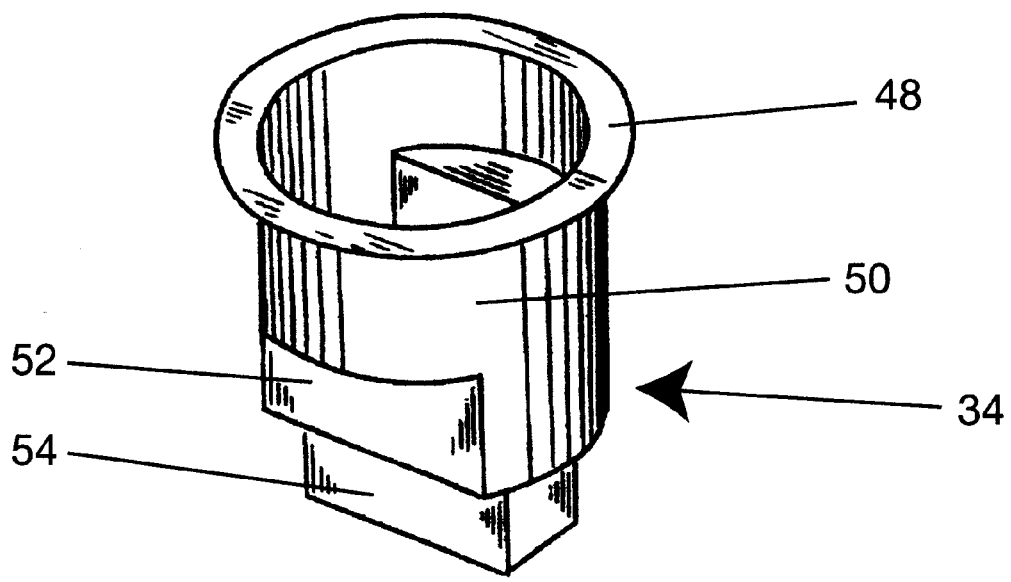
FIG. 6 is a pictorial view of the connector-adapter used to join the collector box to the downspout.
Figure 7:
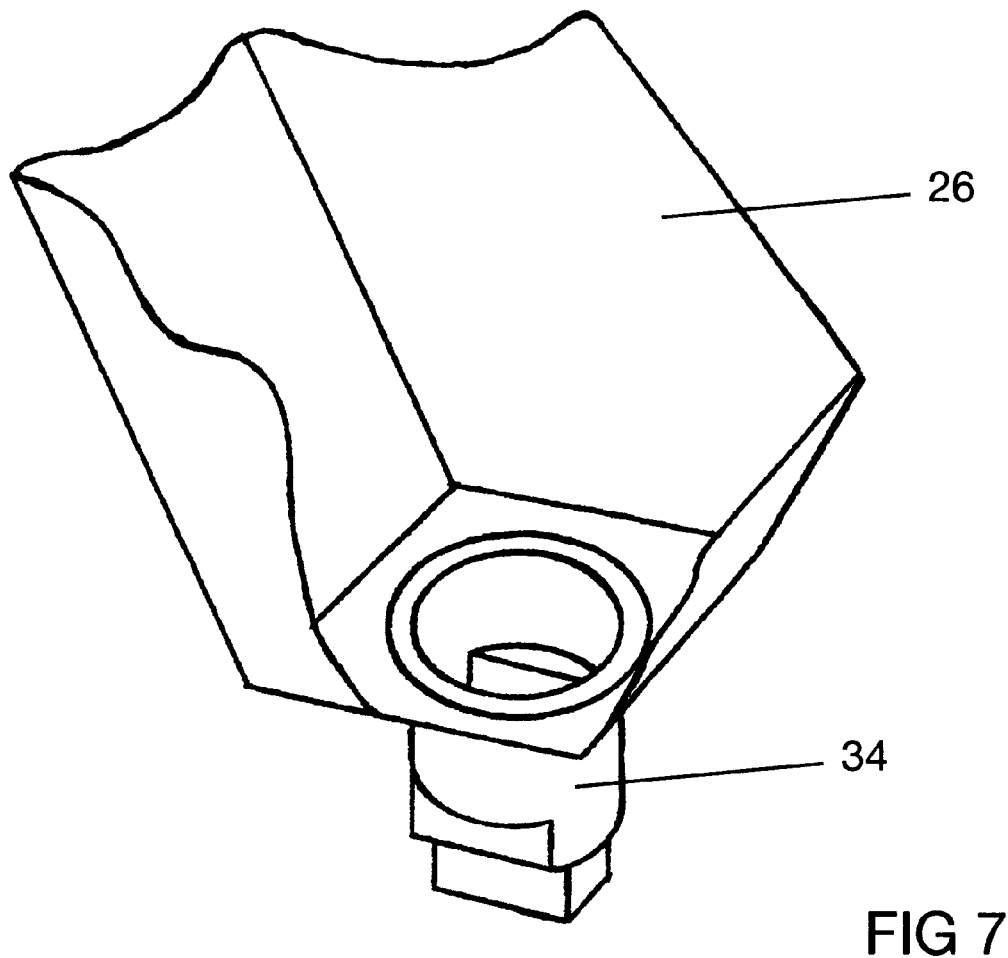
FIG. 7 shows the connector-adapter in position when mounted from above.
Figure 8:
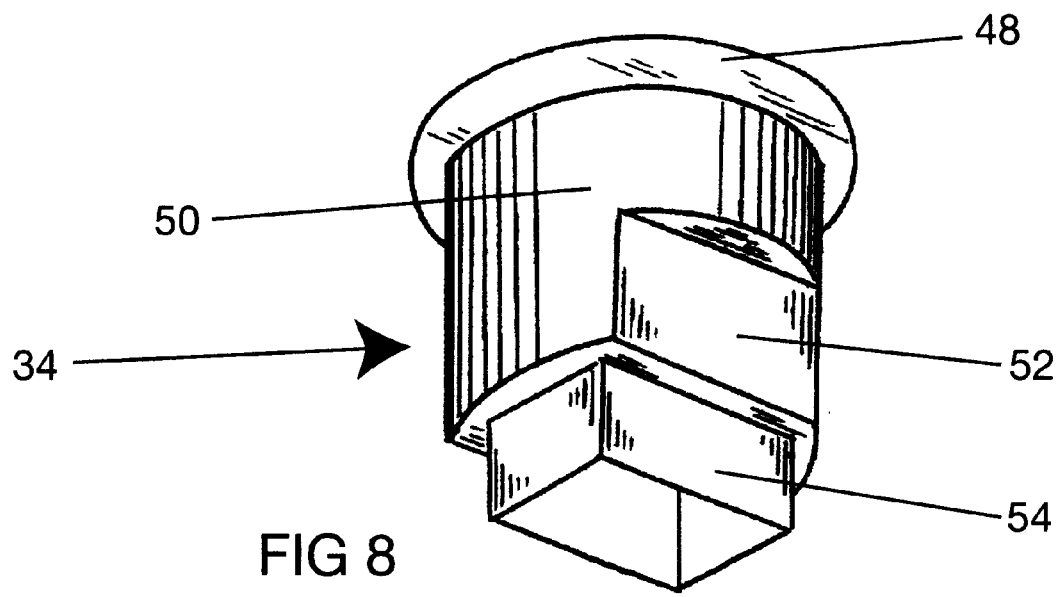
FIG. 8 is a connector-adapter of FIG. 6 as shown from below.
Figure 9:
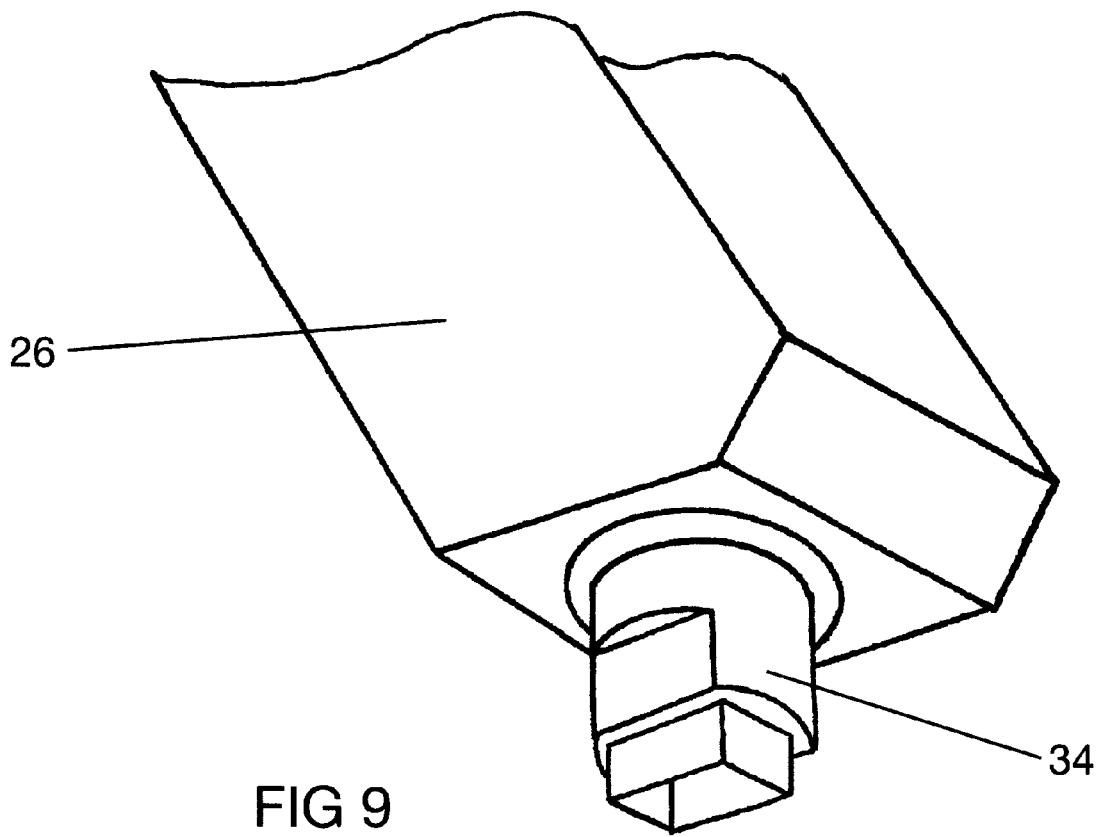
FIG. 9 shows a connector-adapter of FIG. 6 from below, mounted from the bottom.
Figure 10:
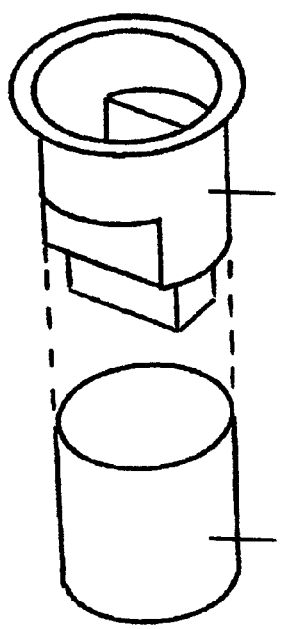
FIGS. 10, 11 and 12 are pictorial views showing the connector-adapter of FIG. 6, illustrating the capability to connect with circular or rectangular downspout pipe at the male connector area.
Figure 11:
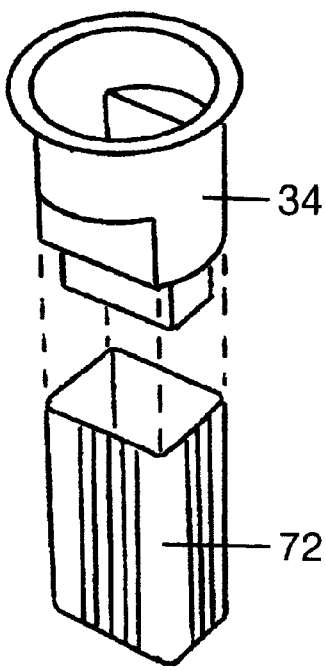
Figure 12:
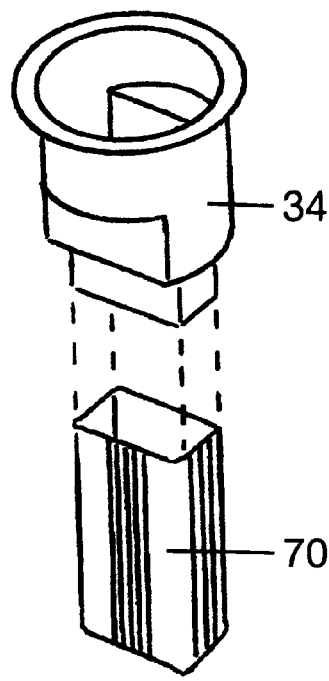
Figure 13:
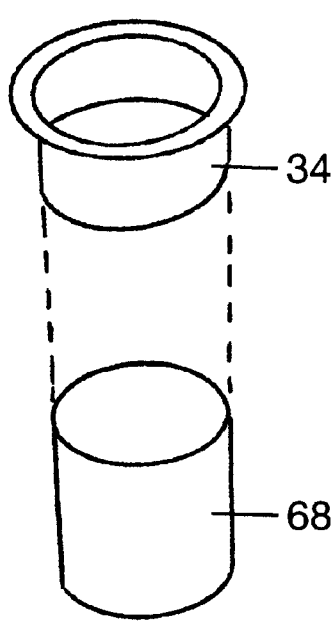
FIGS. 13 and 14 are pictorial views of FIG. 6 after the unneeded connector areas have been removed.
Figure 14:
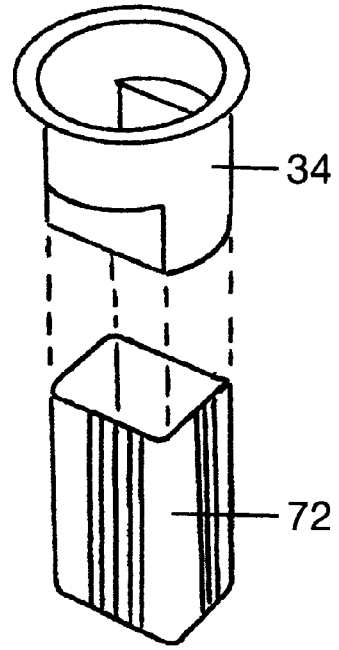

3. A Connector-Adaptor, 34, FIG. 6 and FIG. 8, is a tubular funnel with a ½" flange, 48, at the top; it provides the connection of the Collector Box, 26, and the downspout pipe, 14. This connection requires different size and shape capabilities to be suited to mate with pipes of different shape and size. The most popular sizes of downspout, 14, in use are 2"×3" and 3"×4" rectangular shape. In addition, 4" round plastic drainage pipe (not shown) has the potential to become highly acceptable because of its larger drainage capacity and attractive cost. It was, therefore, opted to design the Connector-Adaptor, 34, to include these three sizes in this initial model, although the Connector-Adaptor, 34, is not limited to only these sizes and shapes. An additional variable is the angle required to connect the gutter, 12, on the edge of the eave to the vertical downspout (not shown) on the structure, as some vertical rectangular downspouts are installed with the longer side abutting the wall while others have the short side.

To accommodate these variables the Connector-Adaptor, 34, is comprised of three male connector surfaces, 50, 52, 54, descending in size. The top connector, 50, has a shape and size to connect to a 4" round plastic drainage pipe providing a 1½" male connector, 50, for such pipe. Below this is a 1½", 3"×4" rectangular male connector, 52, reduced in size and changed in shape to mate with a 3"×4" rectangular pipe. And below this is a 1½", 2"×3" rectangular male connector, 54, reduced in size to mate with 2"×3" rectangular pipe. At the top of the upper round connector, 50, the flange, 48, extends outward on a 90° angle measuring about ½" in width. The flange, 48, is required to provide the connection to the bottom, 32, of the Collector Box, 26. The Connector-Adaptor, 34, can be fastened to the Collector Box, 26, by dropping it down through the round hole from the top, allowing the flange, 48, to rest on the inside bottom, 32, or by securing it to the bottom, 32, from below. Fasteners (not shown), such as sheet metal screws or nuts and bolts are used, or plastic cement can be used if both parts are made of plastic, and all joints are sealed with caulk.

The circular shapes of the upper male connector, 50, and the flange, 48, permit the Connector-Adaptor, 34, to be rotated to any angle needed to accommodate the downspout pipe on the side of the structure.

The unneeded connector surface(s) extending below the selected connector surface to be used are cut off and discarded to permit flow at full capacity. The preferred material and production method is of molded plastic.

Additional methods of joining the downspout to the Collector Box, 26, include: (1) a dedicated fixed connector surface for each different downspout; (2) a movable plate covering an opening in the bottom of the Collector Box, 26, with dedicated connector male surfaces; (3) the downspout, 14, and its elbows can be connected directly by cutting an opening and bending down fastening tabs from the bottom, 32, without a circular hole, of the Collector Box, 26.

Figure 15:
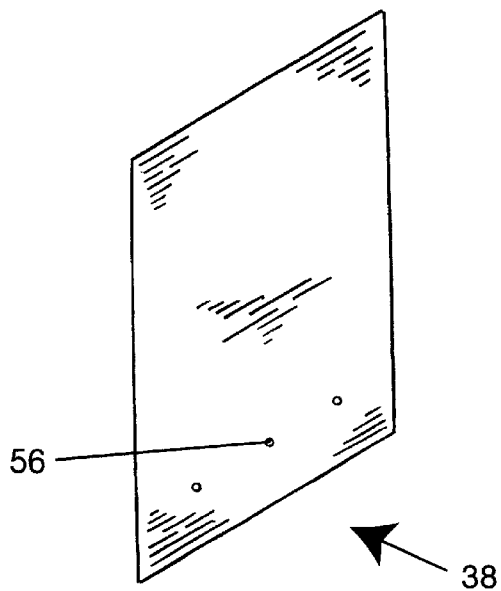
FIG. 15 is a movable mounting plate.
Figure 16:
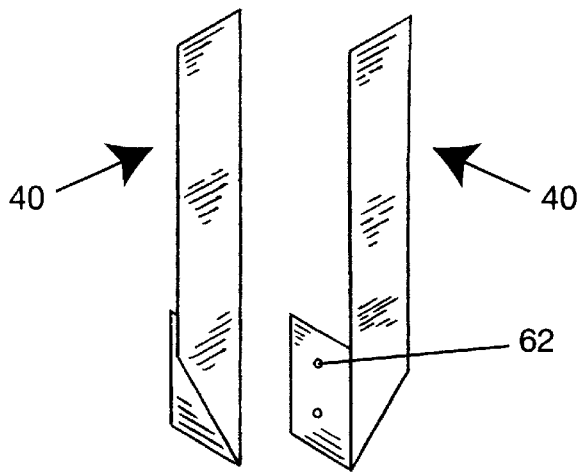
FIG. 16 are movable mounting straps.
Figure 17:
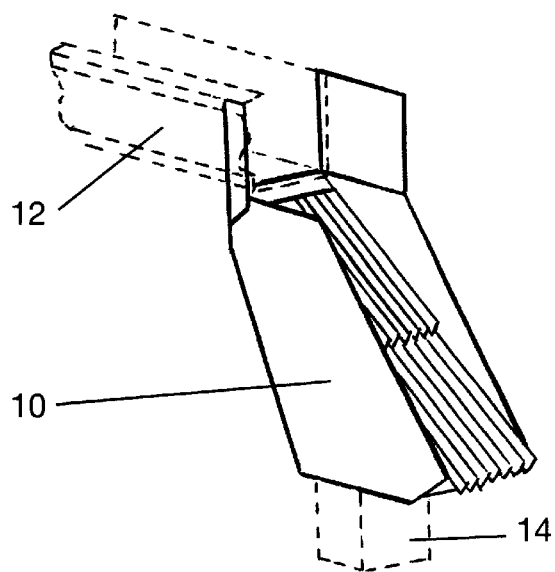
FIG. 17 shows a pictorial view of the OGS as installed at the right end of an open-end gutter with the discharge directed to the side.
Figure 18:
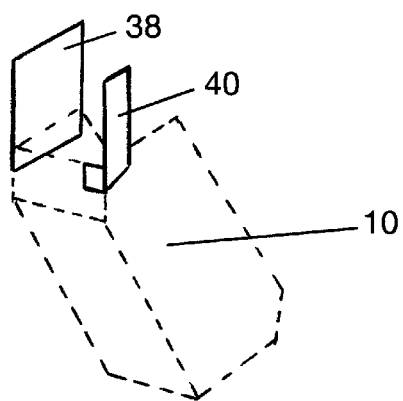
FIG. 18 shows the position of the mounting plate and the mounting strap to place the OGS at the right end position with the discharge directed to the right side.

4. To attach the Collector Box, 26, to both the gutter, 12, and to the structure mounting hardware, comprising a Mounting Plate, 38, FIG. 15, and Mounting Straps, 40, FIG. 16, is provided. In gutter systems, the downspout, 14, can be placed at either end or at any place in between, therefore, the OGS, 10, must also be capable of comparable placement. In addition the OGS, 10, provides for drainage to flow to the side or to the front. The number of collector boxes required to provide a box with fabricated connector hardware designed for dedicated use would present a production and distribution handicap; thus the mounting hardware presented here is moveable allowing a single Collector Box, 26, to be used in all of these varied positions.

The Mounting Plate, 38, is a flat piece of metal or plastic with dimensions of about 7"×5½". It is fastened to the Collector Box, 26, at the top of either side, or upper rear wall, 28, with fasteners such as sheet metal screws, nuts and bolts, or rivets if made of metal; or it can be fastened with plastic cement if both parts are made of plastic. The Mounting Plate, 38, is supplied with holes, 56, that align with holes, 60, on the upper rear wall, 28, and sides, 58, of the Collector Box, 26. When attached, to the sides, 58, or the upper rear, 28, the Collector Box, 26, is extended upward about 5".

The surface selected for attaching the Mounting Plate, 38, is determined by the desired direction of flow. If the direction is desired to the front, the Mounting Plate, 38, is attached to the upper rear wall, 28; and if the desired direction is to the side, the Mounting Plate, 38, is attached to the side, 58. By reversing the sides, the direction of flow is reversed. The Mounting Plate, 38, is always attached to the surface that will be fastened to the structure. The methods of attaching the hardware for selected positions are illustrated in FIG. 17, FIG. 18, FIG. 19, FIG. 20, FIG. 21, and FIG. 22.

The mounting hardware also includes two Mounting Straps, 40. These are pieces of metal or plastic about 7"×1" with a 2"×1" tab at the bottom bent at a 90° angle, one to the left and one to the right with holes, 62, to align with holes, 60, in the Collector Box, 26. The Mounting Strap(s), 40, is attached to the opposite side of the Collector Box, 26, from the Mounting Plate, 38. When the direction of flow is to the side, only one Mounting Strap, 40, is required. Mounting straps, 40, are attached with sheet metal screws, nuts and bolts, or rivets.

After the mounting hardware is attached to the Collector Box, 26, the OGS, 10, is ready for installation on the gutter, 12, and the structure. The OGS, 10, is positioned to align with the downspout, 14, and its elbows. When aligned with the downspout, 14, the gutter, 12, is cut off and removed at a point that will allow the gutter bottom and back to overlap the OGS, 10, by about ½". The OGS, 10, is moved up to a touching position with the bottom of the gutter, 12, while the Mounting Plate, 38, is slid between the back of the gutter, 12, and the structure, usually a fascia, to allow for the overlap. Two screws of at least ¾" or ring nails (not shown) are driven through the overlapped area into the structure. These fasteners secure the OGS, 10, to the gutter, 12, and to the structure simultaneously. Two additional screws or ring nails (not shown) are driven through the Mounting Plate, 38, on the opposite edge. If the OGS, 10, is discharging to the front receiving effluence from both sides, these fasteners will also be driven through an overlapped area.

The Mounting Strap(s), 40, are pulled upward to keep the OGS, 10, in a touching position with bottom of the gutter, 12; and the top of the Mounting Strap(s), 40, is secured to the upper outward edge of the gutter, 12, with sheet metal screws, nuts and bolts, or rivets.

The downspout, 14, is then connected to the Connector-Adaptor, 34, at the bottom, 32, of the OGS, 10, taking care to remove any unneeded male connector surfaces from the Connector-Adaptor, 34, to permit full flow. A piece of the vertical downspout (not shown) equal in length to the Collector Box, 26, plus the Connector-Adaptor, 34, is removed from an existing system. Undamaged elbows and other parts removed can be reinstalled.

It is important that the gutters, 12, be in a proper drainage angle to enable the OGS, 10, to function with full effect. If older gutters, 12, have been bent out of shape, they must be restored to the proper pitch before the OGS, 10, is installed.

The OGS, 10, may be summarized as a device which achieves the separation and ejection of solid debris while collecting the liquid to drain into the downspout, 14. The OGS, 10, is positioned at the end and under an open-end gutter(s), 12, to receive the exiting effluence. Removal of the low point end-stop (not shown) and movement of the downspout connector to below the Collector Box, 26, enables the discharge to stay open and draining consistent with collection speeds and volumes. The effluence, without stoppage or impingement, flows freely out the open end. The OGS, 10, accepts all sizes and shapes of debris that can fit into the gutter, 12, and the steep bars, 22, 24, 42, 44, of the bar strainer, 18 and 20, intercept the solids while the liquids fall through the spaces between the bars 22, 24, 42, 44, protected from wind and splashing, into the Collector Box, 26, to flow into the downspout, 14. Small particles held in suspension in the liquid are not further restricted, but are free to continue through with the liquid. The smooth bars, 22, 24, 42, 44, placed at such a steep angle enable the solids to slide easily off the end. Without restrictions, ensuing debris does not result in a continued build-up, causing blocking and spillage, relieving the property owner from the task of frequent cleaning and concern about soil erosion.

The claims defining this invention are as follows:

1. A strainer for removing debris from rain water in a rain gutter comprising a rain gutter having a lower end, wherein said lower end is open;

a collector box for water, said collector box having an open top and being mounted below said open end of said gutter;

a strainer supported at the top of said collector box, said strainer comprising an upper tier of parallel bars extending from said open end of said gutter to approximately the midpoint of said collector box, and a lower tier of parallel bars extending from a position underlying said upper parallel bars to a position beyond said collector box, wherein said upper bars are positioned above openings formed by spaces between said lower bars in said underlying position, and wherein both tiers of parallel bars are angled with respect to the horizontal in a downward direction from said open end of said gutter; and a connector means for connecting said collector box to a downspout.

2. The invention as set forth in claim 1 in a combination in which the connector means comprises an adapter which has a plurality of engageable features for accommodating a variation in size and shape of the said downspout.

3. The invention as set forth in claim 2, in a combination in which the adapter can be rotated to match the lay of the downspout on the associated structure.

4. The invention as set forth in claim 1 in which the connector means is provided by providing an opening means, by a series of tabs extending downwardly from the bottom of the collector box for providing mounting components for connecting the collector box directly to the downspout.

5. The invention as set forth in claim 1 in a combination which also comprises a mounting plate and a pair of mounting straps, all of which are movable for optional positioning for governing the direction of the discharge of the debris sliding off the strainer, and permitting the collector box to be installed at either end of the gutter or at an intermediate point.

6. The invention as set forth in claim 1 in a combination in which the collector box is horizontally extended to receive maximum expected outflow of water.

\* \* \* \* \*